United States Patent [19]

Carpenter

[11] 4,437,146

[45] Mar. 13, 1984

[54] BOOST POWER SUPPLY HAVING POWER FACTOR CORRECTION CIRCUIT

[75] Inventor: Ralph F. Carpenter, Seattle, Wash.

[73] Assignee: Pacific Electro Dynamics, Inc., Redmond, Wash.

[21] Appl. No.: 406,164

[22] Filed: Aug. 9, 1982

[51] Int. Cl.³ .................................................. H02M 3/335
[52] U.S. Cl. ............................................. 363/21; 363/79; 363/101
[58] Field of Search ................. 363/20, 21, 37, 79, 363/80, 97, 101, 124, 131

[56] References Cited

U.S. PATENT DOCUMENTS

| | | | |
|---|---|---|---|
| 3,913,000 | 10/1975 | Cardwell, Jr. | 363/20 |
| 4,155,112 | 5/1979 | Miller et al. | 363/97 X |
| 4,196,469 | 4/1980 | Gurwicz | 363/97 X |
| 4,264,971 | 4/1981 | Courier de Mere | 363/20 X |
| 4,322,787 | 3/1982 | Kraus | 363/21 |
| 4,355,277 | 10/1982 | Davis et al. | 363/21 X |

OTHER PUBLICATIONS

Silicon Zener Diode & Rectifier Handbook, Motorola, 2nd ed., 1961, p. 135.

Primary Examiner—William M. Shoop
Attorney, Agent, or Firm—Seed and Berry

[57] ABSTRACT

A boost power supply having a full-wave rectifier driving an inductor, diode, and the parallel combination of a filter capacitor and load. A shunting switch connected between the inductor and diode is periodically closed to draw current through the inductor, thereby charging the inductor. The switch is then opened so that the inductor, while discharging, generates a relatively high voltage which is applied to the load and filter capacitor through the diode. The shunting switch is opened and closed in a manner which causes the input current to follow a sinusoidal waveform in phase with the input voltage with an amplitude that maintains the output voltage of the power supply constant. Specifically, a harmonically pure sinusoidal waveform is multiplied by a voltage inversely proportional to the output voltage. An offset is then added and subtracted to this waveform to generate respective positive and negative reference waveforms which are both in phase with the input voltage but differ slightly in magnitude from each other. A signal indicative of the input current is compared to the positive and negative reference waveforms to open the shunting switch when the input current reaches the level of the positive reference waveform and to close the shunting switch when the input current falls to the level of the negative reference waveform. In order to maintain the operating frequency of the switch constant, the difference between the positive and negative reference waveforms may be varied throughout the sinusoidal cycle so that the time for the inductor to charge to the positive reference waveform and discharge to the negative reference waveform is constant.

17 Claims, 5 Drawing Figures

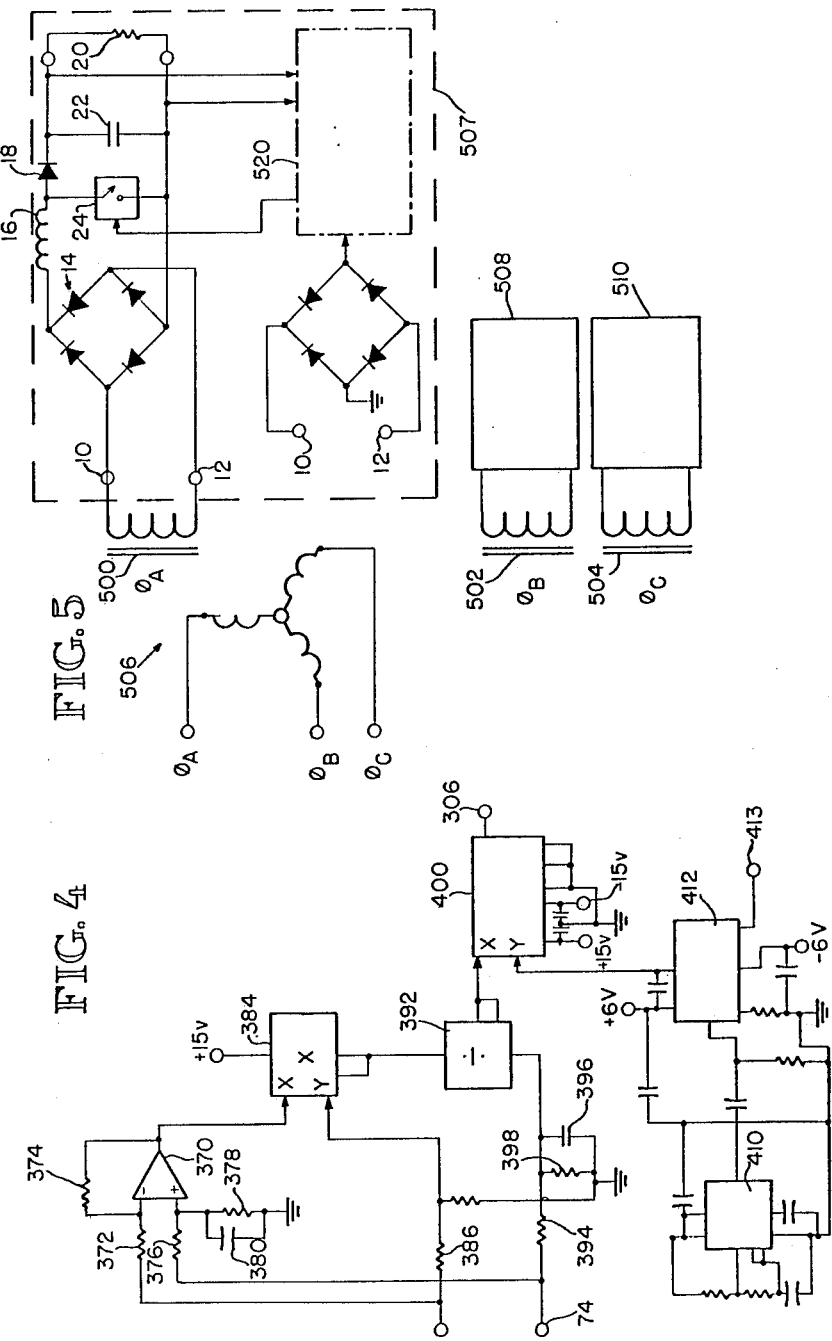

BOOST POWER SUPPLY HAVING POWER FACTOR CORRECTION CIRCUIT

DESCRIPTION

1. Technical Field

This invention relates to power supply circuits, and more particularly, to a regulated boost power supply circuit which draws current in direct proportion to the sinusoidal input voltage.

2. Background Art

Boost power supply circuits are commonly used to generate a DC voltage having a magnitude that is greater than the sinusoidal input voltage. In their simplest form, boost power supply circuits include a four-diode bridge for generating a half-wave-rectified waveform and an inductor and semiconductor switch in series with the bridge. The series combination of a diode and filter capacitor is connected in parallel with the switch. The switch is closed to draw current through and thereby charge the inductor. The switch is then opened, thereby terminating the flow of current through the switch. As the inductor discharges, it generates a relatively high voltage which is coupled to the filter capacitor through the diode. A load is placed across the filter capacitor.

An often serious limitation of boost power supplies and other types of power supplies are their effects on a AC power line driving the power supply circuit. Typically, power supplies initially full-wave rectify the signal received from an AC power line, and the rectifier is followed by either a capacitive input filter or an inductive input filter. A capacitive input filter causes the current to flow only near the peak of the AC waveform in order to recharge the filter because of current flowing from the capacitor during the period from the previous peak. An inductive filter often causes the current to be a square wave. Either of these filters can cause the current waveform to be non-sinusoidal, even though the input voltage waveform is sinusoidal. In general, this distortion is composed of high-frequency harmonic components. The distortion also causes the input power factor be degraded considerably. While less-than-unity power factors and high-frequency harmonics can be tolerated in certain cases, in other cases they can cause a great deal of difficulty.

Attempts to provide a power supply which draws current in direct proportion to the applied voltage have been attempted using a boost power supply circuit. The advantage of a boost power supply circuit in performing this function is that a relatively large voltage can be generated during the relatively low-voltage portion of the input waveform and the power-drawing characteristics of the circuit can be controlled throughout the AC cycle merely be appropriate operation of the shunting switch. Two such attempts are described in articles published by W. E. Rippel and by D. Chambers et al. The approach described in the Chambers et al. disclosure forces the line current to approximate the wave shape of the input line voltage by the use of a summing amplifier rather than a multiplier. This approach yields a best case power factor of approximately 0.95, and the oscillations of the current waveforms disclosed show that there is noticeable distortion of the waveform not recognized in the disclosure. The approach discussed in the Rippel disclosure uses a multiplier, which results in a much improved factor with very little distortion as compared to the Chambers et al. approach. However, if the Rippel approach is used as a power supply rather than a battery charger, as disclosed therein, it would be necessary for the control loop of the power supply to be highly complex in order to maintain stability. As a result, multi-loop compensation schemes are required. This inherent stability results because duty cycle modulation is employed.

DISCLOSURE OF INVENTION

It is an object of the invention to provide a boost power supply having a power factor correction circuit which is stable for all operating modes.

It is another object of the invention to provide a boost power supply that switches the input current between two levels that are directly proportional to the input voltage rather than controlling the duty cycle of the shunting switch in response to a given current requirement.

It is still another object of the invention to provide a boost power supply drawing input current which alternates between two levels that are directly proportional to the input voltage and which are automatically adjusted to maintain the switching frequency substantially constant.

These and other objects of the invention are provided by a boost power supply having a shunting switch. This is modulated so that the input current to the power supply is oscillated between upper and lower reference waveforms which are directly proportional to the sinusoidal input voltage. The current drawn by the power supply circuit is measured and compared to these reference waveforms. When the current drawn by the circuit rises to the upper reference waveform, the shunting switch is opened, thereby allowing the inductor 16 to discharge. When the current drawn by the circuit falls to the lower reference waveform, the shunting switch is closed, thereby causing the current to flow through the inductor. The magnitudes of both reference waveforms are scaled by a voltage that is inversely proportional to the output voltage. Thus, deviation of the output voltage from a reference level varies the reference waveforms to increase or decrease the input current to return the output voltage to the reference level. The offsets between the reference waveforms are automatically adjusted to maintain the operating frequency of the shunting switches relatively constant throughout the AC cycle. In one embodiment, the input voltage is clipped and used to operate a current-programming circuit that varies the offset between the reference waveforms in proportion thereto. In another embodiment, a mathematical formula proportional to the offset required to maintain a constant frequency is implemented with analog circuitry and combined in a phase-lock loop circuit to maintain the operating frequency of the shunting switch substantially constant.

BRIEF DESCRIPTION OF THE DRAWINGS

FIG. 4 is a schematic of an alternative embodiment for operating the current programming circuit.

FIG. 5 is a block diagram of a three-phase boost power supply circuit.

BEST MODE OF CARRYING OUT THE INVENTION

The inventive power supply converts sinusoidal input voltage to regulated DC output voltage. A high power factor is achieved by making the input current roughly proportional to and in phase with the input sinusoidal voltage.

A boost power supply has the characteristic of being able to generate an output voltage that is larger than the input voltage. The sinusoidal input waveform is first full-wave rectified by a 4-diode bridge and then applied to an inductor connected in series with a diode and the parallel combination of the load and a filter capacitor. A switch shunting the diode, load and filter capacitor is periodically closed to charge the inductor and then opened to produce a voltage upon discharge of the inductor, which is coupled through the diode to the load and filter capacitor. Insofar as the output voltage is a function of the inductance, inductor charging current, and the duty cycle of the shunting switch, the output voltage can be greatly in excess of the input voltage. Moreover, since the filter capacitor can store energy during each cycle of the input waveform, the input current can be controlled as desired by the proper switching of the shunting switch. A high switching frequency allows proper control of the current with even a small inductor. A small inductor is desirable because it allows the input current to charge at a faster rate and weighs less. In the inventive boost power supply, the output voltage is regulated and the input current is controlled so that it is directly proportional to the input voltage, thus yielding a high power factor which generates very low harmonics on the AC line supplying power to the power supply. A reference sinusoidal waveform is first derived from the input voltage and multiplied by a scale factor which is inversely proportional to the magnitude of the output voltage. Thus, a reduction in the output voltage from a preset value increases the amplitude of the sinusoidal reference waveform. The input current to the power supply is measured and compared to upper and lower reference waveforms produced by adding positive and negative offsets to the scaled reference waveform. The comparison is then used to control the switch so that the input current varies between the upper and lower reference waveforms. Thus, the switch closes until the input current reaches the upper reference waveform. The shunting switch is then opened, and the inductor discharges until the current falls to the lower reference waveform. The input is thus essentially a sinusoidal waveform in phase with the input voltage waveform. In order to adjust the magnitude of the offsets added to the scaled reference waveform to optimize the performance of the power supply throughout each cycle, the offset is adjusted by an offset control as a function of the input voltage (in one case, input and output voltage), as described in greater detail hereinafter.

Figure 1:
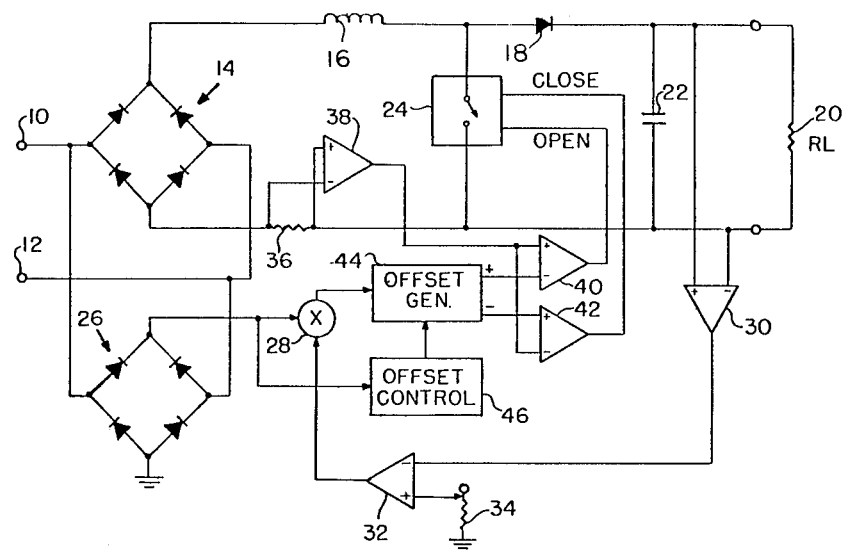
FIG. 1 is a block diagram illustrating the basic concept of the inventive boost power supply.

A block diagram illustrative of the principle of operation of the inventive power supply is shown in FIG. 1. An AC sinusoidal signal is applied to a 4-diode bridge 14 between terminals 10,12 and the output of the bridge 14 is applied to an inductor 16, through which current flows when switch 24 is closed. Under these circumstances, inductor 16 charges. When switch 24 opens, the voltage generated by the discharge of the inductor 16 causes current to flow through diode 18, thereby charging capacitor 22, which clamps the volt across inductor 16. Capacitor 22 thus provides a relatively constant DC voltage across a load 20. The current from the bridge 14 passes through a current-sensing resistor 36 so that the voltage applied to differential amplifier 38 is proportional to the input current. As mentioned above, the switch 24 is operated so that the input current sensed across resistor 36 is directly proportional to the input voltage applied between the terminals 10, 12. The voltage across the load is sensed by a differential amplifier 30, and its output is applied to a differential amplifier 32 having a bias point set by potentiometer 34. The output of the amplifier 32 is thus inversely proportional to the deviation of the output voltage from a set point determined by potentiometer 34.

The voltage waveform from the bridge 14 is not a pure sinusoid since it is effected by the reactive load of inductor 16 and the non-linear characteristics of the switch 24 and diode 18. In order to obtain a relatively pure sinusoidal waveform as a reference for causing the input current to be a relatively pure sinusoid, the AC waveform at terminals 10-12 is rectified by a second 4-diode bridge 26. The bridge 26 drives only a resistive load, so it generates a sinusoidal waveform that is substantially purer than the waveform generated by the bridge 14 under all output load conditions.

The reference waveform from the bridge 26 is scaled by the output of amplifier 32 through a multiplier 28. The output of the multiplier 28 is thus a full-wave, rectified sine wave having a peak amplitude that is inversely proportional to the deviation of the output voltage from a set point determined by potentiometer 34 and VRL. As explained in greater detail hereinafter, the switch 24 operated so that input current follows the reference waveform from the multiplier 28 in order to regulate both the output voltage and the input current. The reference waveform from the multiplier 28 is applied to an offset generator 44 which adds and subtracts a small offset to the reference waveform to produce respective positive and negative reference waveforms. These positive and negative reference waveforms are applied to respective negative and positive inputs of comparators 40,42. The comparators 40,42 also receive the voltage that is proportional to input current from the output of amplifier 38. When the input current falls to the level of the negative reference waveform, the comparator 42 closes switch 24, thereby causing the input current to increase as the inductor 16 charges. When the input current increases to the level of the positive reference waveform, the comparator 40 opens switch 24, thereby causing the input current to decrease as the inductor 16 discharges. The input current thus oscillates between the sinusoidal positive and negative reference waveforms.

It can be shown that the frequency at which the input current oscillates between the positive and negative reference waveforms varies as a function of the input voltage during the sinusoidal cycle as well as a function of the output voltage and inductor value. This can be seen intuitively when one considers that the voltage across the inductor 16 when the switch is closed is the input voltage. Thus, a small input voltage (e.g., at the 10° point of the sine wave) will cause the input current to build up relatively slowly as the switch 24 is closed. A large input voltage (e.g., at the 90° point of the sine wave) will cause the current to build up much faster. The operating frequency of the 24 is, therefore, lower for small input voltages and higher for large input voltages.

For a variety of reasons, it is desirable to maintain the operating frequency of the switch 24 constant during the sinusoidal cycle. This can be accomplished by adjusting the magnitude of the offsets applied to the reference waveform as a function of the input voltage. Accordingly, an offset control circuit 46 reduces the offset produced by the offset generator 44 for small input voltages and increases the offset for large input voltages. The time for the input current to increase to the positive reference waveform and then decrease to the negative reference waveform is, therefore, constant throughout the sinusoidal cycle.

Figure 2:
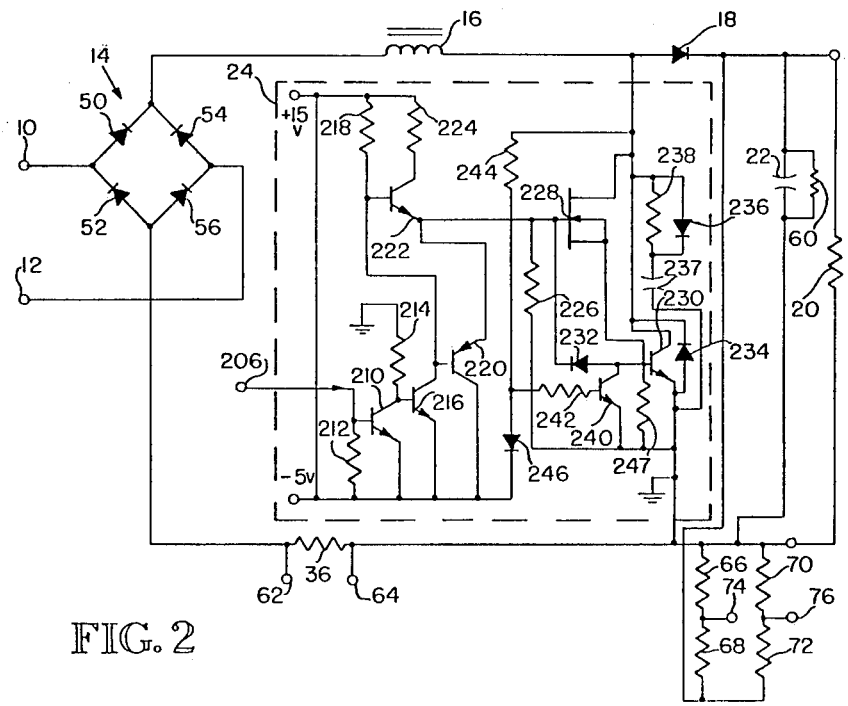
FIG. 2 is a schematic of the basic components of the boost power supply.

The basic components of the boost power supply (not including the circuitry for operating the switch 24) are illustrated in FIG. 2. As with the illustrative block diagram of FIG. 1, the AC waveform is applied to a full-wave bridge 14 consisting of four diodes 50–56. The bridge 14 is connected to the load 20 through the inductor 16 and diode 18. The diode 18 and load 20 are selectively shunted by shunting switch 24, which is described in greater detail hereinafter. The current-sensing resistor 36 is connected in series with the load 20, and it generates a voltage proportional to the current between terminals 62,64. The voltage across the load is applied to voltage divider resistors 70,72 and 66–68, which generate voltages proportional to the output voltage on terminals 76,74, respectively. The voltage on terminal 74 is a larger percentage of the output voltage than the voltage on terminal 76. As explained in greater detail hereinafter, the voltage on terminal 74 normally provides feedback to regulate the output voltage. However, when the output voltage exceeds a larger threshold, the feedback is provided through terminal 76, thereby producing a faster limit on the output voltage with regard for harmonic distortion. A resistor 60 is connected across the load 20 and filter capacitor 22 to provide a discharge path for the capacitor 22 under "no load" conditions.

The shunting switch is operated by a control signal in the form of a logic level applied to terminal 206. A logic high control voltage at terminal 206 drives the base of transistor 210, which is normally held at the negative 5-volt supply level through resistor 212. When transistor 210 conducts, current flows through the base emitter junction of transistor 210, thus drawing current through resistor 214 and cutting off transistor 216. The collector of transistor 216 then rises to the positive supply voltage through resistor 218, thereby cutting off transistor 220 and turning on transistor 222. Transistor 222 then draws current through resistor 224, which flows to ground through resistor 226. The voltage then developed across resistor 226 is applied to the gate of field effect transistor 228, thereby causing the transistor 228 to conduct. With transistor 228 conducting, drive current is supplied to the base of transistor 230, thereby drawing substantial current through the inductor 16.

The switch 24 is opened by opening the current path to terminal 206, thereby withholding drive current from transistor 210 and allowing transistor 216 to saturate through resistor 214. A relatively low voltage is then applied to the bases of transistors 222 and 220, thereby cutting off transistor 222 and turning on transistor 220. The emitter of transistor 220 is then pulled low, thereby turning off FET 228 and pulling the base of transistor 230 low through diode 232. Without current from transistor 228 and with its base held low through diode 232, transistor 230 quickly turns off, thereby attempting to terminate the flow of current through the inductor 16. As a result, inductor 16 generates a relatively large voltage, which is clamped by diode 18 and the load 20 and filter capacitor 22. Diode 234 protects transistor 230 from high-voltage transients. Diode 236, in conjunction with resistor 238 and capacitor 237, protects transistor 230 from supporting high currents by limiting the rate of voltage change across transistor 230. The base of transistor 240 is biased through resistor 242 at just above the negative 5-volt supply by current flowing through resistor 244 and diode 246. Transistor 240, as well as resistor 244, are provided to maintain transistor 230 at cutoff during "power-up" of the circuit by DC power supplies.

The switch 24 thus closes to draw current through the inductor 16 when current is supplied to the switch 24 through terminal 206. The switch 204 opens when current is withheld from the switch. The switch circuitry applies switching levels to the FET 228 that vary between +15 and −5 volts in order to operate the FET 228 at a high speed.

Figure 3:
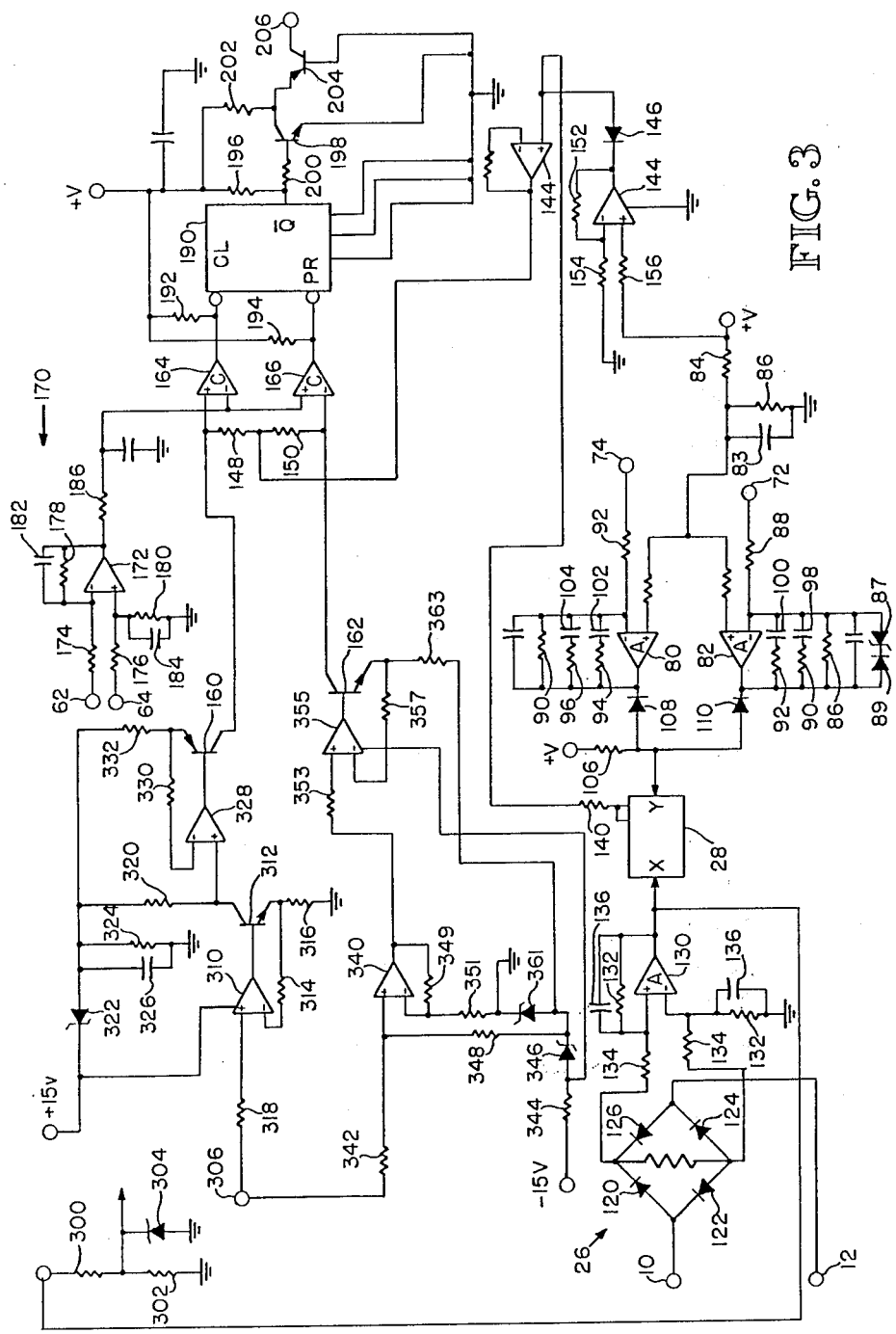
FIG. 3 is a schematic of one embodiment of the remaining components of the inventive boost power supply circuit.

The remaining portion of the boost power supply circuitry is illustrated in FIG. 3. The output voltage feedback signals on terminals 74,76 (FIG. 2) are applied to inverting amplifiers 80,82, respectively. The amplifiers 80,82 also receive a reference voltage Vref, generated across filter capacitor 83 by the voltage divider resistors 84,86. Insofar as the feedback signal on terminal 74 is a larger percentage of the output voltage than the feedback signal on terminal 72, the output of amplifier 80 is more negative than the output of amplifier 82 for small output voltages. However, as the output voltage increases significantly above the reference voltage set by resistors 84,86, the output of amplifier 82 becomes more negative than the output of amplifier 80. As explained in greater detail below, this provides fast limiting of the output voltage when it significantly exceeds the inference voltage. Series combinations of resistors 90–96 and capacitors 98–104 roll off the gain of the amplifiers 80,82 with two different characteristics to ensure stability of the feedback loop since amplifier 82 has a higher bandwidth than does amplifier 80 because of its higher gain. Diode 87 clamps the output stage of amplifier 82 to prevent it from saturating, and diode 89 prevents diode 87 from becoming forward biased. The outputs of the amplifiers 80,82 are positively biased through resistor 106 and diodes 108,110 so that the voltage at the anodes of the diodes 108, 110 is controlled by the more negative of the outputs from the amplifiers 80,82. This voltage is applied to one input of the conventional multiplier 28 to scale the relatively pure sinusoidal reference waveform from bridge 26 in inverse proportion to the output voltage. Moreover, when the output voltage rises significantly above the reference voltage, amplifier 82 takes control to quickly control the voltage.

As mentioned above, the voltage applied to the other input of the multiplier 28 is the reference waveform generated from the sinusoidal input voltage by the full-wave rectifying bridge 26 composed of diodes 120–126. The fullwave rectified output is input to the positive input of amplifier 130, having a gain set by the ratio of resistor 132 to resistor 134. At high frequencies, capacitors 136 roll off the gain. The output of amplifier 130 inputs to the "X" input of the multiplier 28. The output of the multiplier 28 is, therefore, a full-wave rectified voltage scaled in proportion to the difference between the output load voltage and the reference voltage. Thus, when the load voltage falls below the reference voltage, multiplier 28 outputs a larger full-wave rectified signal. This larger full-wave rectified signal increases the input current to the power supply, thereby increasing the charge applied to the inductor so that the inductor 16, when discharging, generates a larger voltage. The larger voltage then boosts the output voltage back to the reference voltage.

The output of the multiplier 28 goes through a current-limiting resistor 140 to a unity gain, current booster 142 and is voltage limited to the output of amplifier 144 through diode 146. The output of the current booster 142 is applied to the junction between resistors 148,150.

The current limit set by amplifier 144 is a function of the amplifier's gain is determined by resistors 152,154 and also by the value of the supply voltage $+V$.

The resistors 148,150 are connected in series with transistors 160,162, which function as current sources and sinks, respectively. The voltage applied to the non-inverting input of comparator 164 is thus greater than the output of current booster 142 by the same amount that the input to the inverting terminal of comparator 166 is less than the output of current booster 142. As described hereinafter, the voltages on the collectors of transistors 160,162 are the positive and negative offset voltages described above with reference to FIG. 1. Comparators 164,166 compare these offsets to the current reference produced by the current reference generator 170. The current reference generator includes an operational amplifier 172 having inverting and noninverting terminals connected to the current-sensing terminals 62,64 through resistors 174,176, respectively. The gain of the amplifier 172 is set by the ratio of resistors 178 to resistor 174 and 180 to 176. Frequency response roll-off is provided by capacitors 182,184. The output voltage of amplifier 172 is thus proportional to the input current, and it is applied through resistor 186 to the negative and positive terminals of amplifiers 164,166, respectively. During operation, while the shunting switch 24 is closed, current increases until the voltage applied to the negative input of comparator 164 exceeds the positive offset voltage applied to the positive terminal of comparator 164. The output of comparator 164 then switches to open the switch 24, as explained in greater detail below. Similarly, as the current decreases responsive to opening of the switch 24, the voltage applied to the positive input of comparator 166 becomes less than the negative offset applied to the negative input of comparator 166. The output of comparator 166 then changes state, thereby closing the switch 24, as explained in greater detail below. The outputs of the comparators 164,166 are applied to a flip-flop 190, which is cleared by comparator 164 when the current reaches the positive offset and preset through comparator 166 when the input current falls to the negative offset. The CLEAR and PRESET inputs are biased high through pull-up resistors 192,194, respectively. The $\overline{Q}$ output of the flip-flop 190 draws sufficient current through resistor 196 to place the base of transistor 198 at ground when the flip-flop 190 is preset. However, the $\overline{Q}$ output of the flip-flop 190 is incapable of supplying current to turn on transistor 198 when flip-flop 190 is cleared. Thus, drive current for transistor 198 is supplied through resistor 196. The collector transistor 198 is biased through load resistor 202 so that the transistor 204 can be turned on when transistor 198 is turned off. This in turn, switches shunting switch 24 on. Thus, as the input current decreases to the negative offset, flip-flop 190 is set through comparator 166, thereby cutting off transistor 198 and forward-biasing transistor 204 through resistor 202. The switch 24 then closes, causing the input current to increase until it reaches the positive offset, thereby clearing flip-flop 190 through comparator 164. The flip-flop 190 then saturates transistor 198 to cut off transistor 204 and open the switch 24.

The voltage regulation process is accomplished in the following manner. When the load voltage is below a predetermined value set by the voltage reference resistors 84,86, the voltage applied to the "Y" input of the multiplier 28 is relatively large. Thus, the multiplier's output and, consequently, the positive and negative offset voltages are also large. As a result, the current, as measured by current-sensing circuit 170, is allowed to increase until it reaches the now larger positive offset voltage applied to the positive input of comparator 164. The increased input current causes the inductor 16 to generate a larger voltage, which is applied to the load 20 in order to increase the output voltage toward the predetermined value. Conversely, an increase in the output voltage causes the output of multiplier 28 to decrease. The input current is therefore allowed to decrease until the current reference voltage applied to the positive input of comparator 166 reaches the now lower negative offset voltage applied to the negative input of the comparator 166. The reduced input current causes the inductor 16 to generate a lower voltage when the inductor 16 discharges, thereby decreasing the output voltage toward the predetermined value.

The current-sensing voltage from 170 thus continuously varies between the positive offset from transistor 160 and the negative offset from transistor 162. Thus, the current-sensing voltage approximates the input voltage within a margin of error equal to the voltage across resistors 140, 148 (hereinafter referred to as the "hysteresis"). Since the input current is directly proportional to the current-sensing voltage, the input current is approximately proportional to and in phase with the input voltage.

As explained above, for a constant hysteresis, the operating frequency of the shunting switch 28 would vary as a function of, among other things, the magnitude of the applied voltage. This is because the available charging current is directly proportional to the input voltage since it is the input voltage that is across the inductor 16 when the switch 24 is closed. Thus, a relatively low input voltage requires a longer time for the input current to reach the positive offset voltage so that the switch 24 would operate at a lower frequency. If the frequency of the input current ripple is too low, high-frequency filters in the AC line connected to terminals 10,12 (FIG. 1) are incapable of attenuating the ripple current. This results in a severe electromagnetic interference (EMI) problem. Consequently, it is desirable to maintain the operating frequency of the switch 24 relatively constant. It can be shown that this frequency will be constant if the hysteresis is proportional to the following:

$$[(V_0-V_{in}) V_{in}]/V_o.$$

where $V_o$ is equal to the output voltage and $V_{in}$ is equal to the input voltage. This formula, calculated for various input and output voltages commonly encountered, resembles a clipped sine wave. Consequently, a hysteresis derived by clipping the input voltage approximates the above formula, thereby yielding a relatively constant frequency for good frequency stability characteristics of the power supply and ensuring relatively low-amplitude ripple currents on the AC power lines. Accordingly, the rectified sinusoidal reference waveform from amplifier 130 is applied to a clipping circuit composed of voltage divider resistors 300, 302 and clipping zener diode 304. This voltage is applied to terminal 306 of a hysteresis programming circuit. The voltage on terminal 306 is applied to the noninverting input of an operational amplifier 310, operating essentially as a voltage follower, with its feedback being provided through the base emitter junction of transistor 312 and resistor 314. Thus, the voltages applied to the inverting and noninverting terminals are substantially equal so that the voltage across resistor 316 is equal to the voltage applied to the amplifier 310 through resistor 318. As a result, the current through resistor 316, and hence through resistor 320, is proportional to the input voltage. Resistor 320 is connected to the positive supply voltage through a zener diode 322. Current flows through the zener diode 322 through resistor 324 and is filtered by capacitor 326 to produce a stable supply voltage that is slightly less than the +15 supply voltage powering amplifier 310. Thus, amplifier 310 receives a supply voltage that is larger than the supply voltage powering other portions of the circuit. The voltage across resistor 320 is applied to the noninverting input of amplifier 328, which, like amplifier 310, functions as a voltage follower through transistor 160 and resistor 330. The voltage across resistor 332, and hence the current through transistor 160, are thus proportional to the voltage applied to amplifier 310 through resistor 318.

The input voltage to the current-programming circuit is also applied to the noninverting input of amplifier 340 through resistor 342. Amplifier 340 is set by resistors 342,348,349,351 to have unity gain. Thus, the output of amplifier 340 is the sum of the voltage applied from terminal 306 to amplifier 340 through resistor 342 and the voltage applied from the cathode of zener diode 346 to the amplifier 340 through resistor 348. The voltage applied to terminal 306 with respect to ground is, therefore, equal to the voltage at the output of amplifier 340 referenced to the voltage on the cathode of diode 346.

The output of amplifier 340 is applied through resistor 353 to an operational amplifier 355 driving transistor 162. Feedback resistor 357 causes amplifier 355 to operate as a voltage follower. The voltage at the emitter of transistor 162 is thus equal to the voltage at the output of amplifier 340, which, it will be remembered, is, when referenced to the voltage on the cathode of diode 346, equal to the voltage applied to terminal 306. Insofar as resistor 363 is connected to the cathode of diode 346, the voltage across resistor 363 is equal to the voltage applied to terminal 306. Amplifiers 355 is biased to an even more negative voltage by diode 346 through resistor 344 so that transistor 162 can place zero across resistor 363. The current supplied through resistor 332 is thus equal to the current drawn through resistor 363. Transistors 160,162 thus act as complimentary current sources and sinks, respectively, to provide a hysteresis to comparators 164,166 that approximates the above formula in order to keep the operating frequency substantially constant.

As mentioned earlier, adjusting the hysteresis so that it is proportional to the clipped AC waveform is merely an approximation of the mathematical formula maintaining the switching frequency constant. The actual formula can be implemented by the circuit illustrated in FIG. 4 to achieve substantially better frequency control. Accordingly, the input voltage from the output of amplifier 130 is applied to the inverting input of amplifier 370 through resistor 372, having a gain determined by resistor 374. At the same time, the voltage on terminal 74, proportional to the output voltage, is applied to the noninverting input of amplifier 370 through resistor 376. Resistor 378 adjusts the gain of amplifier 370, and capacitor 380 rolls off the high-frequency response. The output of amplifier 370 is thus proportional to $V_o - V_{in}$. The output of amplifier 370 is applied conventional multiplier 384, which also receives, through resistor 386, a voltage proportional to the input voltage. The output of the multiplier is thus $V_o (V_o - V_{in})$. The output of the multiplier 384 is, in turn, applied to one input of a conventional divider 392, which also receives the signal proportional to the output voltage through resistor 394 after it has been filtered by capacitor 396 and attenuated by resistor 398. The output of the divider 392 is thus proportional to the formula:

$$[(V_0 - V_{in}) V_{in}]/V_o$$

In order to further improve the constant frequency characteristics of the circuit, this voltage is applied to the input of another multiplier 400, which also receives a phase-lock loop error voltage derived by comparing the operating frequency of the shunting switch 24 to a fixed reference frequency. Accordingly, a stable reference frequency is generated by oscillator 410 and applied to one input of a phase detector 412. The other input of the phase detector receives the Q output of the flip-flop 190 through terminal 413. The phase detector 412 scales the above-described mathematical function through multiplier 400. The output of the multiplier 400 is applied to the input terminal 306 of the current-programming circuit (FIG. 3) to ensure that the operating frequency of the shunting switch 24 is constant.

The inventive boost power supply can also be implemented in a three-phase design, as illustrated in FIG. 5. The secondaries 500,502,504 of a three-phase transformer 506, each drive respective power supply circuits 506-510. The circuit 506 is substantially identical to the single-phase design in that it generates a full-wave rectified waveform from the input which is applied to an inductor 16. The inductor 16 is in series with a shunting switch 24 that is operated by a control circuit 520 identical to the components described above in the single-phase model. The shunting switch 24 is in parallel with the series combination of the diode and the parallel combination of filter capacitor 22 and load resistor 20. Each phase thus functions substantially independently of the others to regulate the voltage supplied to a load.

I claim:

1. In a boost power supply having a diode-rectifying bridge, an inductor, diode and filter capacitor connector in series with said bridge, a shunting switch in parallel with the series combination of said diode and said filter capacitor, an improved power factor correction circuit comprising:

current-sensing means for generating a current-indicating signal indicative of the current flowing into said power supply circuit;

reference waveform generating means producing first and second reference waveforms, each a function of a sinusoidal voltage applied to said bridge, said first reference waveform being larger than said second reference waveform by a predetermined offset voltage; and switch control means receiving said reference waveforms and the output of said current-sensing means for closing said shunting switch when the input current falls to said second reference waveform and for opening said shunting switch when said reference current rises to said first reference waveform.

2. The boost power supply of claim 1, further including means for adjusting the offset voltage between said first and second reference waveforms to maintain the operating frequency of said shunting switch substantially constant.

3. The boost power supply of claim 2 wherein said offset voltage adjusting means comprise:
 a pair of series-connected resistors having a sinusoidal voltage applied to the junction between said resistors;
 current-generating means causing a current to flow through said resistors in proportion to a current-programming signal; and
 current-programming means for generating said current-programming signal as a function of the sinusoidal signal applied to said bridge, thereby generating said first and second reference waveforms on the non-interconnected terminals of said resistors.

4. The power supply of claim 3 wherein said current-programming means comprises a non-linear clipping circuit generating a said current-programming signal as a linear function of the output of said bridge until said output reaches a predetermined value as the output of said bridge increases beyond said predetermined value.

5. The power supply of claim 3 wherein said current-programming means comprise calculating means for generating said current-programming signal in proportion to the formula:

$$[(V_0 - V_{in}) V_{in}]/V_o$$

where $V_o$ is the DC output voltage of said power supply and $V_{in}$ is the instantaneous value of the sinusoidal signal applied to said bridge.

6. The power supply of claim 2 wherein said offset voltage-adjusting means generates as said offset a linear function of the output of said bridge until said output reaches a predetermined value and is then relatively constant as the output of said bridge increases beyond said predetermined value.

7. The boost power supply of claim 2 wherein said offset voltage-adjusting means generates as said offset a signal proportional to the formula:

$$[(V_0 - V_{in}) V_{in}]/V_o$$

where $V_o$ is the DC output voltage of said power supply and $V_{in}$ is the instantaneous value of the sinusoidal voltage applied to said bridge.

8. The boost power of claim 7, further including a phase-lock loop for further adjusting said offset as a function of the phase difference between the operating frequency of said shunting switch and a fixed reference frequency.

9. The power supply of claim 1, further including output voltage-regulating means comprising:
 means for generating a reference voltage;
 comparator means connected to the output of said power supply for generating an output in proportion to the deviation of said power supply output voltage from said reference voltage; and
 scaling means for varying the peak amplitude of said first and second reference waveforms as a function of the output of said comparator means so that the peak amplitude of said reference waveforms are inversely proportional to the deviation of the power supply output voltage from said reference waveform.

10. The boost power supply of claim 9 wherein said comparator means comprise first and second differential amplifiers, each receiving said reference voltage on one of their inputs and respective signals proportional to the power supply output voltage on the other inputs, with the signal applied to said first differential amplifier being a larger percentage of the power supply output than the signal applied to said differential amplifier, and wherein the gain and bandwidth of said second differential amplifier is larger than the gain and bandwidth of said first differential amplifier, the smaller of the two signals from said first and second differential amplifiers being applied to said scaling means so that said voltage-regulating means operates more quickly for deviations of said output voltage from said reference voltage in excess of a predetermined value.

11. The boost power supply of claim 1, further including a second diode-rectifying bridge driving a substantially resistive load for generating a sinusoidal reference for said reference waveform-generating means wherein the purity of said first and second reference waveforms is unaffected by the reactive loading on said first diode bridge produced by said inductor.

12. The boost power supply of claim 1 having its input connected to each of three secondaries of a three-phase transformer and their outputs connected in parallel with each other.

13. A high power factor, voltage-regulated boost power supply circuit comprising:
 a diode-rectifying bridge connected to a sinusoidal power source;
 an inductor, diode, and load connected in series with each other and with said bridge;
 a filter capacitor connected in parallel with said load;
 a shunting switch connected in parallel with the series combination of said diode and filter capacitor to selectively shunt said diode, load, and filter capacitor, thereby alternately charging and discharging said inductor;
 voltage-sensing means generating an output voltage feedback signal that is inversely proportional to the deviation of the voltage at the output of said power supply circuit from a predetermined reference voltage;
 current-sensing means for generating a current feedback signal indicative of the input current to said power supply circuit;
 reference waveform-generating means for producing a reference waveform that is a function of the sinusoidal waveform applied to said bridge;
 multiplying means receiving the output of said reference waveform-generating means and the output of said voltage-sensing means for generating a scaled reference waveform that is proportional to the product of said reference waveform and said voltage feedback signal;

offset-generating means for adding and subtracting an offset voltage to said scaled reference waveform, thereby providing respective first and second reference waveforms;

comparator means receiving said first and said second reference waveforms, respectively, on one input and said current feedback signal on their other inputs; and shunting switch control means connected to the outputs of said first and second comparator means for closing said shunting switch when said second comparator means determines that said current feedback signal has fallen to the level of said second reference waveform and for opening said shunting switch when said first comparator means determines that said current feedback signal has risen to the level of said first reference waveform.

14. The power supply circuit of claim 13 wherein said offset-generating means comprise a voltage-controlled current source, and a pair of resistors connected in series with said current source, the junction between said resistors being connected to the output of said multiplying means and the other junctions of said resistors being connected to the first and second comparators, respectively, whereby the voltage applied to said first comparator is the sum of the output of said multiplying means and the voltage drop across said first resistor and the signal applied to said second comparator is the difference of the output of said multiplying means and the voltage deop across said second resistor.

15. The power supply of claim 14, further including current-programming means controlling the operation of said current-generating means as a function of the instantaneous amplitude of the sinusoidal signal applied to said bridge.

16. The power supply circuit of claim 15 wherein said current-programming means comprise a clipping circuit receiving a sinusoidal signal in phase with the sinusoidal signal applied to said bridge, said clipping circuit generating an output that is a linear function of the sinusoidal signal up to a predetermined level and is thereafter relatively constant as said sinusoidal signal increases beyond said predetermined level.

17. The power supply circuit of claim 15 wherein said current-programming means generates an output proportional to the formula:

$$[(V_o - V_{in}) V_{in}]/V_o$$

where $V_o$ is the DC voltage of said power supply and $V_{in}$ is the instantaneous value of the sinusoidal signal applied said bridge.

* * * * *